Patented Oct. 27, 1936

2,058,664

UNITED STATES PATENT OFFICE 2,058,664

BARIUM FLUOSILICATE

Fred C. Carlson, Lakewood, Ohio, assignor to The Grasselli Chemical Company, Cleveland, Ohio, a corporation of Delaware No Drawing. Application March 24, 1934, Serial No. 717,271

5 Claims. (Cl. 23—88)

This invention relates to the manufacture of barium fluosilicate, and is particularly directed to a process wherein barium sulfide is added to fluosilicic acid in the amount required to leave an excess of neither, and wherein impurities, such as non-coagulated silica, are removed as such from the reaction slurry prior to drying.

The processes of my invention lead to a barium fluosilicate of low acidity and which may be used as an insecticide without damage to foliage.

Barium fluosilicate has already been made by the reaction of barium sulfide and fluosilicic acid, but its acidity has been so high that when used as an insecticide considerable foliage damage resulted. Also the barium fluosilicate slurry, even when made by the best known procedures, was very difficult to dry on a drum dryer as some silicic acid was present as a hydrosol, and, on drying the slurry, serious scale formation was encountered which interfered with the drying operation.

I have found that a product of desirably low acidity does not result when the theoretically equivalent amounts of barium sulfide and fluosilicic acid are reacted, but that a further addition of barium sulfide is necessary.

The theoretical reaction between barium sulfide and fluosilicic acid, from which the equivalent amounts would normally be computed, may be indicated as follows:

(1) $H_2SiF_6 + BaS \rightarrow BaSiF_6 + H_2S$.

Unfortunately, the fluosilicic acid hydrolyzes somewhat, especially in the presence of barium sulfide. This is indicated as follows:

(2) $H_2SiF_6 + (x+2) H_2O \rightleftharpoons 6HF + SiO_2 \cdot xH_2O$.

Thus six molecules of hydrofluoric acid are liberated which react with the barium sulfide as follows:

(3) $6HF + 3BaS \rightarrow 3BaF_2 + 3H_2S$.

Or, considering Equations (2) and (3) together, the reaction may be illustrated thus:

(4) $H_2SiF_6 + 3BaS + (x+2) H_2O \rightarrow$
$3BaF_2 + 3H_2S + SiO_2 \cdot xH_2O$.

Comparing Equations (1) and (4) it is seen that when the desired reaction (1) is followed only one molecule of barium sulfide is required for each molecule of fluosilicic acid, while three molecules of barium sulfide are required for each molecule of fluosilicic acid according to Equation (4). It is thus apparent that when the theoretical quantities are computed according to Equation (1) therewill be a deficiency of barium sulfide and the product obtained will be of an acidic nature. Nor is it possible to determine in advance how much barium sulfide will follow the reaction of Equation (4).

I have found that the best mode of procedure is to first react the theoretically required amounts of barium sulfide and fluosilicic acid, and when this reaction is complete, determine the amount of remaining fluosilicic acid and add barium sulfide to react with it. I then determine again how much excess fluosilicic acid remains and add barium sulfide to react with it. This is repeated until an end point test indicates that neither reactant is present in excess.

As a practical matter, I usually add a little more barium sulfide than seems equivalent to the remaining fluosilicic acid. I am thus enabled more quickly to reach a balance of reactants. If an excess of barium sulfide is inadvertently added, fluosilicic acid is added to react with it.

In commercial use, after one batch has been run with a certain supply of materials and the required amounts of barium sulfide and fluosilicic acid determined, I react these quantities of materials so long as the supply lasts. It is then only necessary to make one or two tests to balance the solution.

It is noted that if too great an excess of barium sulfide is used the finished product tends to contain barium fluoride and silicic acid, and if an excess of fluosilicic acid is used the acidity of the finished product is too high.

I have also found that to obtain an entirely satisfactory product it is better to add the barium sulfide to the fluosilicic acid rather than adding the fluosilicic acid to the barium sulfide.

In the first place when the fluosilicic acid is added to the barium sulfide, the decomposition of the acid as in Equation (2) is promoted by the large excess of barium sulfide present. When the barium sulfide is added to the fluosilicic acid, it is reacted upon as added and the acid is decomposed to a much smaller extent.

A second important consideration is the fact that the product, barium fluosilicate, reacts as follows:

(5) $BaSiF_6 + 2BaS + (x+2) H_2O \rightarrow$
$3BaF_2 + SiO_2 \cdot xH_2O + 2H_2S$.

Consequently, if the fluosilicic acid is added to the barium sulfide the product formed decomposes in the barium sulfide solution according to Equation (5). When the barium sulfide is added to the fluosilicic acid, the product forms in the fluosilicic acid solution and does not decompose.

It is thus seen that by adding the barium sulfide to the fluosilicic acid the decomposition of the acid and of the product is held to a minimum.

It is noted that even when barium sulfide is added to fluosilicic acid, instead of the reverse, there is a rather great concentration of barium sulfide at the point of addition so there is some hydrolysis. Various other factors, such as rate of addition, type and condition of equipment, etc., affect the extent of the hydrolysis and because of their number and the complexity of their inter-relation it is impractical to attempt computation of the amount of barium sulfide required to react with the fluosilicic acid, and the hydrofluoric acid resulting from hydrolysis.

In general, I prefer to add barium sulfide in the amount required to react with the fluosilicic acid and to compensate for the hydrofluoric acid which forms from the hydrolysis of fluosilicic acid.

The product formed by following the above steps is of low acidity and is admirably adapted for use as an insecticide.

I have also found that a further improvement in the quality of my product may be effected by treating the barium fluosilicate slurry to remove silica as such therefrom. Commercial fluosilicic acid frequently contains some silicic acid as an impurity. There is also some silicic acid present in the slurry as a result of reactions of the type of those shown in Equations (4) and (5).

In order to remove the silicic acid from the barium fluosilicate, I permit the reaction slurry to stand until the barium fluosilicate settles, decant off the supernatant liquor, which contains non-coagulated silicic acid as a hydrosol, and then reslurry the barium fluosilicate. The reslurried product may then be drum dried without the objectionable scaling on the drum heretofore encountered. The product is also greatly improved as it is of somewhat lower acidity and consequently will not damage foliage.

While the step of balancing the quantites of reactants and the step of separating impurities cooperate to produce an insecticide of very desirable properties, I may use either step independently of the other to obtain a fairly satisfactory barium fluosilicate.

The following specific examples more fully illustrate the practice of my invention:

*Example I.*—The reaction was carried out in a gas tight receptacle provided with an agitator and an H$_2$S outlet. The H$_2$S generated during the reaction was withdrawn and utilized. 205 parts by weight of a 25% commercial fluosilicic acid solution was diluted with 455 parts by weight of water. This solution was at room temperature, 30° C. To this solution was added, over a period of one hour, 443 parts by weight of a 17° Bé. barium sulfide liquor at 80° C. The slurry was agitated throughout the period of the reaction.

At the end of the reaction an end point test was made as follows:

A sample was withdrawn, filtered and the filtrate divided into two parts. To the first was added a few drops of reagent barium sulfide solution and after a few minutes a white precipitate of barium fluosilicate was noted. This indicated a slight excess of fluosilicic acid in the slurry. It is noted that if no precipitate is found in the first part the second part of the test sample is treated with a few drops of reagent fluosilicic acid solution. A precipitate of white barium fluosilicate indicates excess barium sulfide. A precipitate in neither case indicates that the batch is properly balanced. Caution must be exercised to avoid mistaking a sulfur precipitate for one of barium fluosilicate.

As the test indicated a slight excess of fluosilicic acid, more barium sulfide was added to the slurry. After five minutes agitation of the slurry to ensure completion of the reaction, a sample was again withdrawn to determine which, if either, reactant was present in excess. The batch was found to be properly balanced. Had either reactant been present in excess it would, of course, have been necessary to add more of the other reactant, agitate, and test again.

The slurry was dried and the resultant barium fluosilicate was found to have a low acidity (direct acidity as Ba(HF$_2$)$_2$ content) and constituted an excellent product for use as an insecticide.

*Example II.*—This reaction was carried out in a gas tight receptacle provided with an agitator and an H$_2$S outlet. 51.2 parts by weight of a 25% fluosilicic acid solution, diluted with 119 parts by weight of water, was run into the reaction receptacle. This solution was at room temperature. Over a period of one hour 111 parts by weight of 17° Bé. barium sulfide liquor at 80° C. was added to the fluosilicic acid solution. The slurry was agitated throughout the period of reaction.

The slurry was permitted to rest so as to allow settling of the precipitate. After one hour the supernatant liquor was decanted off and the precipitate was reslurried with water. The slurry was then drum dried to yield a dry barium fluosilicate entirely suitable for use as an insecticide. No scaling on the drum was encountered.

*Example III.*—The process of this example illustrates my preferred procedure. An air tight reaction receptacle provided with an agitator and H$_2$S outlet was used. 51.2 parts by weight of a 25% fluosilicic acid solution, diluted with 119 parts by weight of water, was run into the reaction receptacle. This solution was at room temperature. Over a period of one hour 111 parts by weight of 17° Bé., at 80° C., barium sulfide solution was added to the fluosilicic acid solution with continuous agitation. The reaction slurry was then tested, as in Example I, and adjusted until no excess of either reactant was found. The slurry was then allowed to rest, and, after the barium fluosilicate settled, the supernatant liquor was decanted off. The precipitate was reslurried and drum dried. The product had a very low acidity—direct acidity as Ba(HF$_2$)$_2$—and constituted an excellent insecticide.

While I have disclosed specific conditions in the above examples I do not intend to be limited thereto.

The concentration and temperatures of the solutions may, of course, be widely varied. I prefer to add enough water to the fluosilicic acid to make the reaction slurry contain about 10% of barium fluosilicate.

The test for excess of either reactant used to balance their amounts which is set forth in Example I is preferred, but I may, of course, use any other suitable test which discloses the same information. I may, for example, use an electrometric pH measurement.

Instead of removing soluble impurities, such as non-coagulated silica, by settling and decantation, I may filter the slurry. Again I may convert the silica to fluosilicic acid by adding the required amount of hydrofluoric acid. It would then be necessary to add barium sulfide to again balance the slurry.

This conversion with hydrofluoric acid is the theoretically ideal procedure, but it is much too expensive to find wide application. I prefer to use the decantation method of separation as it requires little equipment, is relatively rapid, and is quite economical. The filtration mode of separation requires filters with a very large capacity as otherwise the filtration will be so slow that the silica will coagulate and render filtration virtually impossible.

My invention is not to be limited by the examples and details given above as it is obviously susceptible to numerous modifications, and I intend the scope of my invention to be limited only by the following claims:

I claim:

1. In a process of making barium fluosilicate, the steps comprising reacting barium sulfide with fluosilicic acid by adding the barium sulfide to a fluosilicic acid solution, such quantities of barium sulfide and fluosilicic acid being used as to leave an excess of neither, physically separating silica together with the solution from the precipitated product, and drying the product.

2. In a process of making barium fluosilicate, the steps comprising reacting barium sulfide with fluosilicic acid by adding the barium sulfide to a fluosilicic acid solution, the barium sulfide being added in the amount required to react with the fluosilicic acid and to compensate for the hydrofluoric acid which forms from the hydrolysis of fluosilicic acid, physically separating silica together with the solution from the precipitated product, and drying the precipitate.

3. In a process of making barium fluosilicate, the steps comprising reacting barium sulfide with fluosilicic acid by adding the barium sulfide to a fluosilicic acid solution, the quantities of barium sulfide and fluosilicic acid being such as to leave an excess of neither, settling the reaction slurry, decanting off the supernatant liquor together with silica, reslurrying the precipitate, and drying the precipitate.

4. In a process of making barium fluosilicate, the steps comprising reacting barium sulfide with fluosilicic acid by adding the barium sulfide to a fluosilicic acid solution, determining whether either reactant is present in excess and if so, adding more of the other, then repeating the determination and corrective addition until no excess of either reactant is found, settling the resultant slurry, decanting off the supernatant liquor together with silica, reslurrying the precipitate, and drying the precipitate.

5. In a process of making barium fluosilicate, the steps comprising reacting barium sulfide with fluosilicic acid by adding the barium sulfide to a fluosilicic acid solution, the barium sulfide and fluosilicic acid being used in equivalent amounts, determining the excess of fluosilicic acid remaining and adding barium sulfide to react with such excess, determining whether either reactant is present in excess and if so, adding more of the other, then repeating the determination and corrective addition until no excess of either reactant is found, physically separating silica together with the solution from the precipitate, and drying the precipitate.

FRED C. CARLSON.